(12) United States Patent
Van Der Schaar

(10) Patent No.: US 7,020,193 B2
(45) Date of Patent: Mar. 28, 2006

(54) PREFERRED TRANSMISSION/STREAMING ORDER OF FINE-GRANULAR SCALABILITY

(75) Inventor: Mihaela Van Der Schaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 561 days.

(21) Appl. No.: 09/962,280

(22) Filed: Sep. 24, 2001

(65) Prior Publication Data

US 2002/0037037 A1    Mar. 28, 2002

Related U.S. Application Data

(60) Provisional application No. 60/234,606, filed on Sep. 22, 2000.

(51) Int. Cl.
H04B 1/66 (2006.01)
H04N 11/02 (2006.01)
H04N 11/04 (2006.01)
H04N 7/12 (2006.01)

(52) U.S. Cl. .............................. 375/240.01
(58) Field of Classification Search ............ 375/240.1, 375/240.12, 240.13, 240.14, 240.2, 240.22, 375/240.23; 348/394.1, 397.1, 401.1, 403.1, 348/410.1, 415.1; 382/234, 236, 238; H04N 7/12
See application file for complete search history.

(56) References Cited

U.S. PATENT DOCUMENTS 5,349,383 A * 9/1994 Parke et al. .............. 375/240.1
5,418,571 A * 5/1995 Ghanbari ................ 375/240.16
6,275,531 B1 * 8/2001 Li .......................... 375/240.12
6,580,754 B1 * 6/2003 Wan et al. .............. 375/240.01
6,639,943 B1 * 10/2003 Radha et al. ........... 375/240.11
6,728,317 B1 * 4/2004 Demos ................... 375/240.21

FOREIGN PATENT DOCUMENTS

WO    WO0139503    11/2003

OTHER PUBLICATIONS

H. Radha et al; "Scalable Internet Video Using MPEG-4" Signal Processing, Image Communication, Elsevier Science Publishers, Amsterdam, NL, vol. 15, No. 1-2, Sep. 1999, pp. 95-126, XP0041806040.
M. Van Der Schaar et al; "Scalable MPEG-4 Video Coding With Graceful Packet-Loss Resilience Over Bandwidth-Varying Networks", IEEE International Conference on Multimedia and Expo. Proceedings Latest Advances in the Fast Changing World of Multimedia, XX, XX, vol. 3, Jul. 30, 2000, pp. 1487-1490, XP000981416.

* cited by examiner

*Primary Examiner*—Nhon Diep

(57) ABSTRACT

A method for streaming enhancement layer video frame data on a variable bandwidth network involves coding original uncoded video data with a non-scalable codec to generate I and P base layer frames; generating residual temporal B frames and SNR I and P frames from the original uncoded video data and the base layer frames; coding the temporal and SNR frames with a scalable codec; determining an available bandwidth of the variable bandwidth network; transmitting at least portions of the scalable coded temporal frames when the available bandwidth is a first bandwidth ranging between a minimum bit-rate allocated for transmitting only base layer frames and a predetermined bit-rate which is below a maximum bit-rate of the network; and additionally transmitting remaining portions of the scalable coded temporal frames and at least portions of the scalable coded SNR frames when the available bandwidth is a second bandwidth extending between the predetermined bit-rate and the maximum bit-rate of the network.

9 Claims, 4 Drawing Sheets

US 7,020,193 B2

PREFERRED TRANSMISSION/STREAMING ORDER OF FINE-GRANULAR SCALABILITY

This application claims the benefit of U.S. Provisional Application No. 60/234,606 filed Sep. 22, 2000.

RELATED APPLICATIONS

Commonly-assigned, copending U.S. patent application Ser. No. 09/590,825, entitled "Hybrid Temporal-SNR Fine Granular Scalability Video Coding", filed Jun. 9, 2000.

FIELD OF THE INVENTION

The present invention relates to video coding, and more particularly to a method for streaming enhancement layer residual temporal and quality signal-to-noise-ratio (SNR) video frame data on a variable bandwidth computer network such as the Internet.

BACKGROUND OF THE INVENTION

Scalable video coding has been used for compressing video transmitted over computer networks having a varying bandwidth, such as the Internet. One such video coding scheme is fine granular scalable (embedded) video coding. Fine granular scalable (FGS) video coding has been adopted by the ISO MPEG-4 standard as the core video coding method for the MPEG-4 Streaming Video Profile.

As shown in FIG. 1, the FGS video coding scheme includes a motion-compensated base layer 10, encoded with a non-scalable codec to include I, P, and B frames at the bit-rate $R_{BL}$, and an enhancement layer 11 encoded with a scalable codec, such as FGS to include quality signal-to-noise-ratio (SNR) I, P, and B residual frames at a maximum bit-rate $R_{max}$. At transmission time, a portion of the enhancement layer 11 corresponding to the bit-rate $R_{EL}$ is "cut" from the FGS encoded bitstream, such that the available bandwidth $R=R_{BL}+R_{EL}$.

If, for example, the enhancement layer stream needs to accommodate clients with bit-rates ranging between 100 kbit/s and 1 Mbit/s, $R_{BL}$ will be set to 100 kbit/s and $R_{max}$ will be set to 1 Mbit/s. Hence, the base layer I, P, and B frames coded at 100 kbit/s, will always be transmitted. However, if more bandwidth is available, at least a portion of the enhancement layer residual I, P, and B frames will also be transmitted.

FIGS. 2A and 2B show exemplary FGS hybrid temporal-SNR video coding schemes as described in the earlier mentioned commonly assigned, copending U.S. patent application Ser. No. 09/590,825. In the video coding scheme of FIG. 2A, a base layer 12 is encoded with a non-scalable codec to include I, P, and B frames, and an enhancement layer 13 is encoded with a scalable codec, such as FGS, to include residual B frames, i.e., temporal frames (FGST frames when FGS encoding is used) and quality signal-to-noise ratio residual I and P frames, i.e, quality signal-to-noise-ratio (SNR) frames (FGS frames when FGS encoding is used). In the video coding scheme of FIG. 2B, a base layer 14 is encoded with a non-scalable codec to include only I and P frames, i.e., no B-frames are coded in the base layer 14. An enhancement layer 15 is encoded similar to the coding scheme of FIG. 2A with a scalable codec, such as FGS, to include residual B frames, i.e., FGST frames and SNR residual I and P frames, i.e., FGS frames.

During transmission by a server, the base layer I, P, and B frames (coding scheme of FIG. 2A) or the base layer I and P frames (coding scheme of FIG. 2B) are coded up to $R_{BL}$, and are always transmitted. If more bandwidth is available, the current approach for transmitting the enhancement layers 13, 15 in the coding schemes of FIGS. 2A and 2B is to allocate the enhancement-layer bits ($R_{EL}$) equally between the FGS and FGST frames using a rate-control strategy.

One disadvantage associated with FGS codecs is their reduced coding efficiency compared with the non-scalable $R_{EL}$. This efficiency penalty is due to insufficient temporal decorrelation achieved with FGS (the temporal correlations are exploited only in the base-layer), and not due to the embedded coding of the enhancement layers.

Temporal correlation in the enhancement layer can be reduced by improving the temporal decorrelation in the base layer. This can be accomplished by allocating a greater number of bits to the base layer. However, this is not possible since $R_{BL}$ corresponds to the minimum bandwidth guaranteed to be available to clients at all times. If $_{BL}$ is increased, some of these clients will not be able to decode the base layer at certain times, which is contrary to the MPEG-4 standard.

SUMMARY OF THE INVENTION

The present invention is directed to streaming enhancement layer video frame data on a variable bandwidth network, the enhancement layer video frame data having scalable coded residual temporal video frame data and scalable coded residual quality signal-to-noise-ratio (SNR) video frame data. One aspect of the invention involves a method comprising coding original uncoded video data with a non-scalable codec to generate base layer frame data; generating residual temporal and SNR video frame data from the original uncoded video data and the base layer frame data; coding the residual temporal and SNR video frame data with a scalable codec to generate the enhancement layer video frame data with the scalable coded residual temporal and SNR video frame data; determining an available bandwidth of the variable bandwidth network; transmitting at least portions of the scalable coded residual temporal frame data when the available bandwidth is a first bandwidth ranging between a minimum bit-rate allocated for transmitting only base layer frame data and a predetermined bit-rate which is below a maximum bit-rate of the network; and additionally transmitting remaining portions of the scalable coded residual temporal frame data and at least portions of the scalable coded SNR frame data when the available bandwidth is a second bandwidth extending between the predetermined bit-rate and the maximum bit-rate of the network.

Another aspect of the invention involves a system comprising means for coding original uncoded video data with a non-scalable codec to generate base layer frame data; means for generating residual temporal and SNR video frame data from the original uncoded video data and the base layer frame data; means for coding the residual temporal and SNR video frame data with a scalable codec to generate the enhancement layer video frame data with the scalable coded residual temporal and SNR video frame data; means for determining an available bit-rate of the variable bandwidth network; means for transmitting at least portions of the scalable coded residual temporal frame data when the available bandwidth is a first bandwidth ranging between a minimum bit-rate allocated for transmitting only base layer frame data and a predetermined bit-rate which is below a maximum bit-rate of the network; and means for additionally transmitting remaining portions of the scalable coded residual temporal frame data and at least portions of the scalable coded SNR frame data when the available bandwidth is a second bandwidth extending between the predetermined bit-rate and the maximum bit-rate of the network.

A further aspect of the invention involves a video rate controller comprising means for determining an available bandwidth of the variable bandwidth network; means for transmitting at least portions of scalable coded residual temporal frame data when the available bandwidth is a first bandwidth ranging between a minimum bit-rate allocated for transmitting only base layer frame data and a predetermined bit-rate which is below a maximum bit-rate of the network; and means for additionally transmitting remaining portions of the scalable coded residual temporal frame data and at least portions of scalable coded SNR frame data when the available bandwidth is a second bandwidth extending between the predetermined bit-rate and the maximum bit-rate of the network.

An additional aspect of the invention involves a memory medium comprising: code for coding original uncoded video data with a non-scalable codec to generate base layer frame data; code for generating residual temporal and SNR video frame data from the original uncoded video data and the base layer frame data; code for coding the residual temporal and SNR video frame data with a scalable codec to generate the enhancement layer video frame data with the scalable coded residual temporal and SNR video frame data; code for determining an available bandwidth of the variable bandwidth network; code for transmitting at least portions of the scalable coded residual temporal frame data when the available bandwidth is a first bandwidth ranging between a minimum bit-rate allocated for transmitting only base layer frame data and a predetermined bit-rate which is below a maximum bit-rate of the network; and code for additionally transmitting remaining portions of the scalable coded residual temporal frame data and at least portions of the scalable coded SNR frame data when the available bandwidth is a second bandwidth extending between the predetermined bit-rate and the maximum bit-rate of the network.

BRIEF DESCRIPTION OF THE DRAWINGS

The advantages, nature, and various additional features of the invention will appear more fully upon consideration of the illustrative embodiments now to be described in detail in connection with accompanying drawings where like reference numerals identify like elements throughout the drawings.

DETAILED DESCRIPTION OF THE INVENTION

A method, according to the principles of the present invention, will now be described for streaming enhancement layer residual temporal and quality signal-to-noise-ratio (SNR) video frame data (FGST and FGS frame data in the case of FGS encoding) on a variable bandwidth computer network such as the Internet. The method employs the hybrid temporal-SNR scalable video coding scheme of FIG. 2B to achieve significant improvements in temporal correlation in the enhancement layer. Accordingly, the entire disclosure of commonly-assigned, copending U.S. patent application Ser. No. 09/590,825 is incorporated herein by reference. Although the video coding scheme of FIG. 2B shows only one temporal frame between the SNR frames, temporal-SNR scalable video coding schemes having two or more temporal frames between the SNR frames may also be used in the method.

Figure 3:
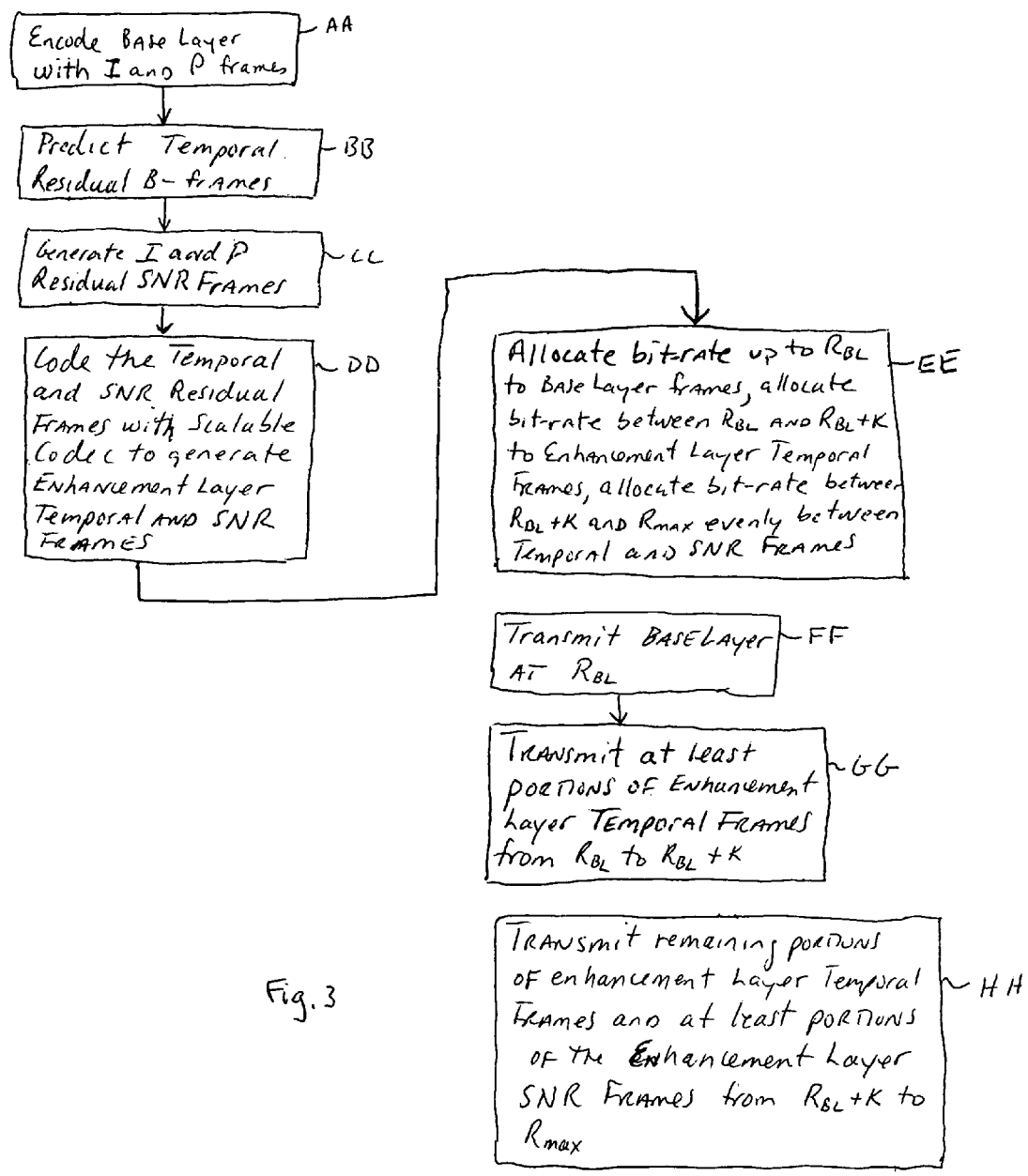
FIG. 3 is a flowchart depicting the steps of the method according to the principles of the present invention.

FIG. 3 is a flow chart depicting the steps of the method according to the principles of the present invention. Steps AA–DD take place at the encoder side of the systems described in U.S. patent application Ser. No. 09/590,825, now U.S. Pat. No. 6,639,943 and steps EE–HH take place at the server side of the systems described in U.S. patent application Ser. No. 09/590,825, now U.S. Pat. No. 6,639,943.

Figure 1:
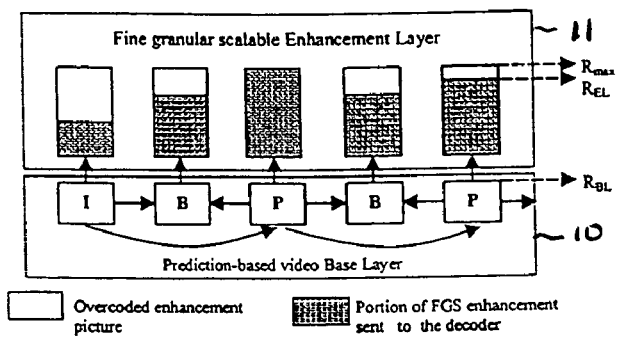
FIG. 1 shows a current enhancement layer video coding scheme.
Figure 2A:
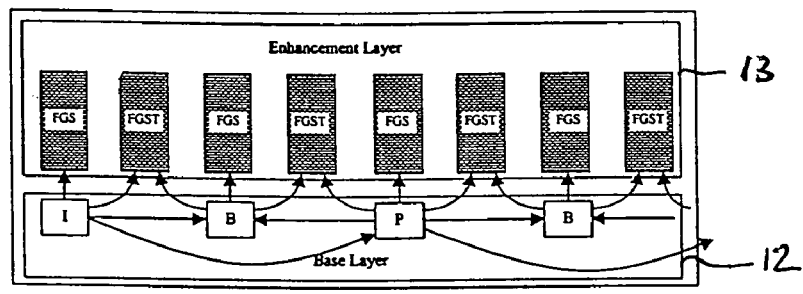
FIGS. 2A and 2B show exemplary FGS hybrid temporal-SNR video coding schemes which are used in the present invention.
Figure 2B:
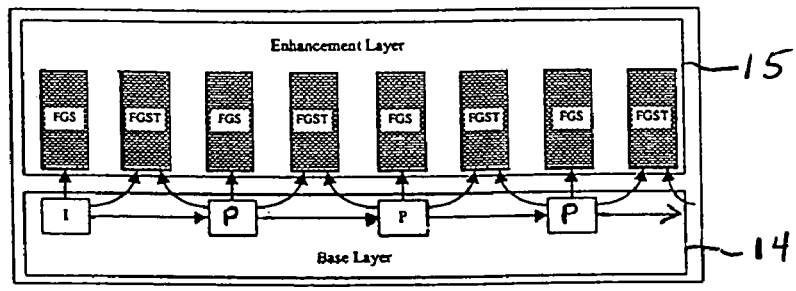

In step AA, the original uncoded video data is encoded with a non-scalable codec to generate the base layer 14 having only I and P frames as depicted in FIG. 2B. No B frames are encoded in the base layer. Using the video coding scheme of FIG. 2B takes advantage of the fact that only the I and P-frames contribute significantly to temporal decorrelation. Accordingly, not coding B frames in the base layer provides higher quality base layer I and P frames as more bits of $R_{BL}$ are available for coding the I and P frames. The higher quality base I and P frames correspondingly improves the temporal decorrelation in the base layer.

In step BB, motion compensated or temporal residual B frames are predicted by computing the difference between the original video data and reference I and P base layer frames. Two temporally adjacent base layer reference frames are used for predicting each temporal residual B frame. The B-frames benefit in this coding scheme because they are more accurately predicted from improved quality reference base layer I and P frames.

In step CC, improved quality or signal-to-noise-ratio (SNR) residual I and P frames are generated by computing the difference between the original video data and the base layer frames reference frames. The SNR residual I and P frames benefit in this coding scheme because they are encoded with a reduced amount of temporal correlation. This in turn will lead to improved performance when coded with a scalable codec further on.

In step DD, the temporal residual frames and the SNR residual frames are coded with a suitable scalable codec, such as FGS, to generate an enhancement layer with scalable coded temporal B frames and scalable coded SNR I and P frames. In the embodiment shown in FIG. 2B, the residual temporal and SNR frames have been coded with FGS, thus, generating temporal enhancement layer B frames denoted by FGST frames and SNR enhancement layer I and P frames denoted by the FGS frames.

In step EE, the bit-rate up to $R_{BL}$ is allocated to the higher quality I and P base layer frames, the bit-rate between $R_{BL}$ and $R_{BL}+k$, where k is less than or equal to $R_{BL}$ is allocated to the enhancement layer temporal frames and the bit-rate between $R_{BL}$+k and $R_{max}$ is evenly allocated between the temporal frames and the SNR frames.

In step FF, the I and P base layer frames are always transmitted at the bandwidth $R_{BL}$.

In step GG, at least portions of the enhancement layer temporal frames are transmitted when the available bandwidth is determined to be between $R_{BL}$ and $R_{BL}$+k, where k is less than or equal to $R_{BL}$. This is preferably accomplished by gradually transmitting the at least portions of the temporal frames one at a time. The strategy for determining which temporal frame portions are transmitted first may be based on motion-activity as this information is already determined by the encoder during encoding wherein the temporal frame portions with the greatest motion activity are transmitted first. The strategy for determining which temporal frame portions are transmitted first may also be based on peak signal-to-noise-ratio or other parameters.

In step HH, remaining portions of the enhancement layer temporal frames and at least portions of the enhancement layer SNR frames are additionally transmitted when the available bandwidth is determined to be between $R_{BL}$+k and $R_{max}$.

Figure 4:
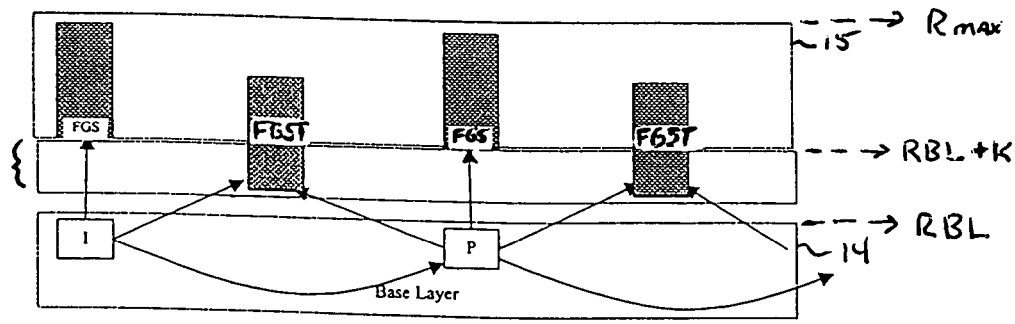
FIG. 4 graphically illustrates the method as applied in the structure of FIG. 2B.

FIG. 4 graphically illustrates the method as applied in the structure of FIG. 2B.

Figure 5:
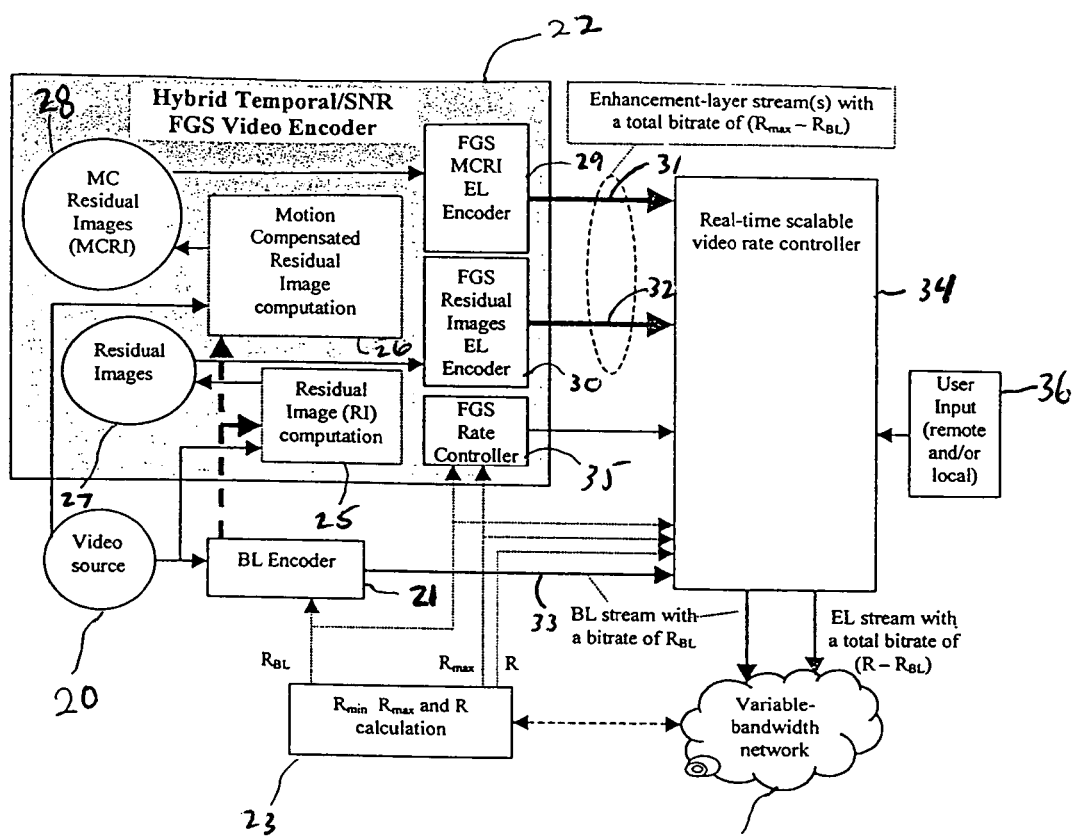
FIG. 5 shows an exemplary embodiment of a system utilizing the hybrid scalability coding scheme of the present invention.

As mentioned earlier, the method may be performed using the system described in earlier mentioned U.S. patent application Ser. No. 09/590,825, now U.S. Pat. No. 6,639,943 which is shown in FIG. 5. At the encoder, uncoded video data from a video source 20 is inputted to both a base layer encoder 21 and the hybrid temporal-SNR scalable video encoder 22. The base layer encoder 21 codes a portion of the original video data using a standard frame-prediction coding technique. The base layer encoder 21 compresses the video data at a predetermined bit-rate, $R_{BL}$. It is preferred that $R_{BL}$ be determined by a calculation block 23, based on a current bandwidth of the associated variable bandwidth network 24. The calculation block 23 measures a minimum bit-rate ($R_{MIN}$), a maximum bit-rate ($R_{MAX}$), and a current available bandwidth (R) of the network 24. The calculation block 23 then sets $R_{BL}$ preferably to $R_{MIN}$ to ensure that, even at its lowest bandwidths, the network 24 will be able to accommodate the coded video data.

The original video data from the video source 20 and the coded video data (i.e. the base layer) provided by base layer encoder 21 are routed to both a residual image (RI) computation block 25 and motion compensated residual image (MCRI) computation block 26 in the hybrid encoder 22. The RI computation block 25 and MCRI computation block 26 use the original video data and the coded video data to generate the residual images 27 and motion compensated (MC) residual images 28. More specifically, the RI computation block 25 receives coded video data from base layer encoder 21 and then decodes that coded video data. Thereafter, residual images 27 are generated based on a difference between pixels in this decoded video data and pixels in the original video data. The MCRI computation block 26 receives coded video data from base layer encoder 21 and then decodes that coded video data. Thereafter, the MC residual images 28 are generated based on a motion-compensation approach from the decoded video data. This motion-compensation picture is then subtracted from the corresponding original picture.

The hybrid encoder 22 also includes an MCRI enhancement layer encoder 28 and a residual image enhancement layer encoder 30, both of which utilize a scalable codec such as FGS. During operation, the MCRI enhancement layer encoder 29 and the residual image enhancement layer encoder 30 respectively code the MC residual images 22 and residual images 12 using the scalable codec.

The MCRI enhancement layer encoder 29 generates a data stream of compressed temporal frames 31, and the RI enhancement layer encoder 30 generates a data stream of SNR frames 32. The data streams 31, 32 can be combined to produce a single enhancement layer data stream or can be maintained as two separate streams. Either case, the resulting stream(s) can be stored or transmitted in real-time.

At the server, a real time scalable video rate controller 34 receives the temporal and SNR frame data streams 31, 32 (along with the base layer frame data stream 33 generated by the base layer encoder 21) and performs in real time the method steps EE–HH described above. The rate controller 34 typically includes a processor in communication with a memory (not depicted). Processor may be any special purpose or general purpose processor that can perform method steps EE–HH. The processor may include code, which when executed, performs method steps EE–HH. The code may be contained in the memory.

The rate controller 34 performs steps EE–HH of the method based on inputs R, $R_{BL}$ and $R_{MAX}$ received from the calculation block 23, FGS rate controller 35 and optional user input 36. Since the bit-rate up to $R_{BL}$ is allocated to base layer I and P frames, and the base layer frames are always transmitted, based on these inputs, the rate controller 34 determines the available bandwidth remaining for transmitting the temporal and the SNR frames (R–$R_{BL}$). Based on this information, the rate controller 34 allocates the bit-rate between the enhancement layer streams 31, 32 in accordance with step EE of method.

After allocating the bit-rate among the frame data streams, the rate controller 34 transmits the data streams, in accordance with steps FF–HH of method, on a variable-bandwidth network 24 as a base layer stream and an enhancement layer stream.

Besides better temporal decorrelation, the present invention has the side benefit that the B-frames are always coded with FGST and thus only 1 residual (the MC-residual) needs to be computed, thereby resulting in lower complexity and better efficiency, since the sign needs to be coded only once. Also, because the base layer contains only I and P frames its complexity is only moderate. The more computationally and memory traffic complex B frames are introduced only in the enhancement layer.

Figure 6:
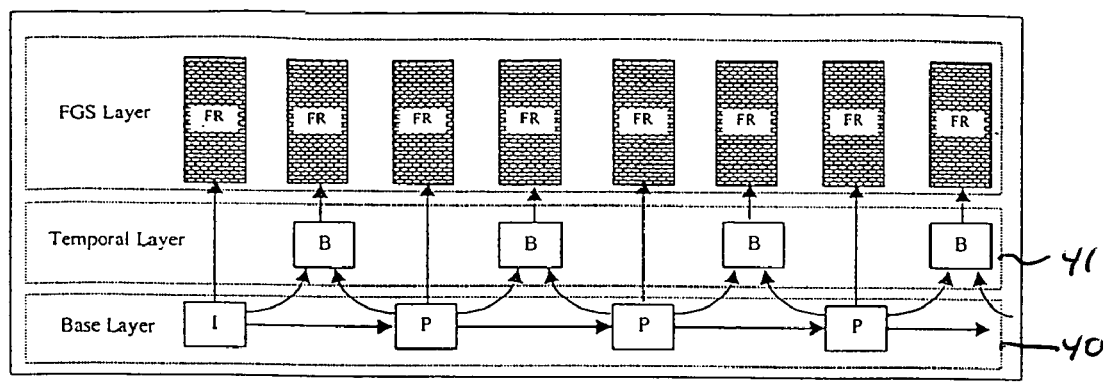
FIG. 6 shows another exemplary FGS hybrid temporal-SNR video coding scheme which may be used in the present invention.

The method of the invention may also employ the hybrid temporal-SNR scalable video coding scheme shown in FIG. 6 which includes a base layer 40 coded with I and P frames and two enhancement layers, i.e., a temporal layer 41 coded with temporal B-frames, and an SNR layer 42 coded with SNR I and P frames. The details of this coding scheme are also discussed at depth in the aforementioned U.S. patent application Ser. No. 09/590,825, now U.S. Pat. No. 6,639,943.

While the foregoing invention has been described with reference to the above embodiments, various modifications and changes can be made without departing from the spirit of the invention. Accordingly, all such modifications and changes are considered to be within the scope of the appended claims.

What is claimed is:

1. A method for streaming enhancement layer video frame data on a variable bandwidth network, the enhancement layer video frame data having scalable coded residual temporal video frame data and scalable coded residual quality signal-to-noise-ratio (SNR) video frame data, the method comprising:

coding original uncoded video data with a non-scalable codec to generate base layer frame data;

generating residual temporal and SNR video frame data from the original uncoded video data and the base layer frame data;

coding the residual temporal and SNR video frame data with a scalable codec to generate the enhancement layer video frame data with the scalable coded residual temporal and SNR video frame data;

allocating a bit-rate $R_{BL}$ for transmitting only the base layer frame data;

allocating a first bit-rate range for transmitting only the scalable coded residual temporal frame data, the first bit-rate range ranging between $R_{BL}$ and $R_{BL}+k$, wherein k is less than or equal to the bit rate $R_{BL}$;

allocating a second bit-rate range for transmitting only the scalable coded residual temporal frame data and the scalable coded SNR frame data, the second bit-rate range ranging between $R_{BL}+k$ and a maximum bit-rate $R_{MAX}$ of the network;

determining an available bit-rate of the variable bandwidth network;

transmitting at least portions of the scalable coded residual temporal frame data, but not the scalable coded SNR frame data, when the available bit-rate is within the first bit-rate range;

transmitting remaining portions of the scalable coded residual temporal frame data and at least portions of the scalable coded SNR frame data when the available bit-rate is within the second bit-rate range.

2. The method according to claim 1, wherein the base layer frame data includes data for only I and P frames.

3. The method according to claim 2, wherein the scalable coded residual temporal frame data includes data only for B frames.

4. The method according to claim 3, wherein the scalable coded SNR video frame data includes only data for I and P frames.

5. The method according to claim 1, wherein the scalable coded residual temporal frame data includes data only for B frames.

6. The method according to claim 1, wherein the scalable coded SNR video frame data includes amity data for I and P frames.

7. A system for streaming enhancement layer video frame data on a variable bandwidth network, the enhancement layer video frame data having scalable coded residual temporal video frame data and scalable coded residual quality signal-to-noise-ratio (SNR) video frame data, the system comprising:

means for coding original uncoded video data with a non-scalable codec to generate base layer frame data;

means for generating residual temporal and SNR video frame data from the original uncoded video data and the base layer frame data;

means for coding the residual temporal and SNR video frame data with a scalable codec to generate the enhancement layer video frame data with the scalable coded residual temporal and SNR video frame data;

means for allocating a bit-rate $R_{BL}$ for transmitting only the base layer frame data;

means for allocating a first bit-rate range for transmitting only the scalable coded residual temporal frame data, the first bit-rate range ranging between $R_{BL}$ and $R_{BL}+k$, wherein k is less than or equal to the bit rate $R_{BL}$;

means for allocating a second bit-rate range for transmitting only the scalable coded residual temporal frame data and the scalable code SNR frame data, the second bit-rate range ranging between $R_{BL}+k$ and a maximum bit-rate $R_{MAX}$ of the network;

means for determining an available bit-rate of the variable bandwidth network;

means for transmitting at least portions of the scalable coded residual temporal frame data, but not the scalable coded SNR frame data, when the available bit-rate is within the first bit-rate range;

means for transmitting remaining portions of the scalable coded residual temporal frame data and at least portions of the sealable coded SNR frame data when the available bit-rate is within the second bit-rate range.

8. A video rate controller comprising:

means for allocating a bit-rate $R_{BL}$ for transmitting only the base layer frame date;

means for allocating a first bit-rate range for transmitting only the scalable coded residual temporal frame data, the first bit-rate range ranging between $R_{BL}$ and $R_{BL}+k$, wherein k is less than or equal to the bit rate $R_{BL}$;

means for allocating a second bit-rate range for transmitting only the scalable coded residual temporal frame data and the scalable coded SNR frame data, the second bit-rate range ranging between $R_{BL}+k$ and a maximum bit-rate $R_{MAX}$ of the network;

means for transmitting at least portions of the scalable coded residual temporal frame data, but not the scalable coded SNR tame data, when an available bit-rate of a variable bandwidth network is determined to be within the first bit-rate range;

means for transmitting remaining portions of the scalable coded residual temporal frame data and at least portions of the scalable coded SNR frame data when the available bit-rate is within the second bit-rate range.

9. A computer program for streaming enhancement layer video frame data an a variable bandwidth network, the enhancement layer video frame data having scalable coded residual temporal video frame data and scalable coded residual quality signal-to-noise-ratio (SNR) video frame data, computer program stored in a computer readable medium executable by a computer the computer program comprising:

code for coding original uncoded video data with a non-scalable codec to generate base layer frame data;

code for generating residual temporal and SNR video frame data from the original uncoded video data and the base layer frame data;

code for coding the residual temporal and SNR video frame data with a scalable codec to generate the enhancement layer video frame data with the scalable coded residual temporal and SNR video frame data;

code for allocating a bit-rate $R_{BL}$ for transmitting only the base layer frame data;

code for allocating a first bit-rate range for transmitting only the scalable coded residual temporal frame data, the first bit-rate range ranging between $R_{BL}$ and $R_{BL}+k$, wherein k is less than or equal to the bit rate $R_{BL}$;

code for allocating a second bit-rate range for transmitting only the scalable coded residual temporal frame data and the scalable coded SNR frame data, the second bit-rate range ranging between $R_{BL}+k$ and a maximum bit-rate $R_{MAX}$ of the network;

code for determining an available bit-rate of the variable bandwidth network;

code for transmitting at least portions of the scalable coded residual temporal frame data, but not the scalable coded SNR frame data, when the available bit-rate is within the first bit-rate range;

code for transmitting remaining portions of the scalable coded residual temporal frame data and at least pardons of the scalable coded SNR frame data when the available bit-rate is within the second bit-rate range.

* * * * *